United States Patent
Takizawa et al.

(10) Patent No.: US 6,528,156 B1
(45) Date of Patent: Mar. 4, 2003

(54) INFRARED CUTOFF FILM

(75) Inventors: Tuyoshi Takizawa, Shizuoka (JP); Shinichi Takahashi, Shizuoka (JP)

(73) Assignee: Tomoegawa Paper Co., Ltd, Tokyo (JP)

(*) Notice: Subject to any disclaimer, the term of this patent is extended or adjusted under 35 U.S.C. 154(b) by 0 days.

(21) Appl. No.: 09/581,088

(22) PCT Filed: Oct. 14, 1999

(86) PCT No.: PCT/JP99/05671

§ 371 (c)(1),
(2), (4) Date: Jun. 9, 2000

(87) PCT Pub. No.: WO00/23274

PCT Pub. Date: Apr. 27, 2000

(30) Foreign Application Priority Data

Oct. 16, 1998 (JP) .............................. 10-294892

(51) Int. Cl.⁷ ..................... B32B 18/00; B32B 27/16; B32B 27/20
(52) U.S. Cl. .................. 428/323; 428/328; 428/413; 428/522
(58) Field of Search ..................... 428/323, 328, 428/402, 688, 689, 413, 522

(56) References Cited

U.S. PATENT DOCUMENTS

| | | | |
|---|---|---|---|
| 5,518,810 A | * | 5/1996 | Nishihara et al. ........... 428/328 |
| 5,807,511 A | * | 9/1998 | Kunimatsu et al. ........... 252/587 |
| 6,057,587 A | * | 5/2000 | Ghandehari et al. ......... 257/437 |
| 6,261,684 B1 | * | 7/2001 | Takahashi et al. ........... 428/345 |

FOREIGN PATENT DOCUMENTS

| | | | |
|---|---|---|---|
| JP | 63227437 | * | 9/1988 |
| JP | 9-156025 | | 6/1997 |
| JP | 10-265718 | | 10/1998 |

* cited by examiner

*Primary Examiner*—Stevan A. Resan
*Assistant Examiner*—Nikolas J. Uhlir
(74) *Attorney, Agent, or Firm*—Wenderoth, Lind & Ponack, L.L.P.

(57) ABSTRACT

An infrared cut-off layer containing an ITO powder is formed on one surface of a base film, to form an infrared cut-off film. The ITO powder has a minimum value of a diffused-reflection-functional logarithm, $\log f(R_d)$, at a light wavelength of 470 nm or lower, which logarithm is measured on the basis of the following equation, $f(R_d)=(1-R_d)^2/2R_d=\alpha/S$ ($R_d$: a relative reflectance to a standard sample, $\alpha$: an absorption coefficient, S: a scattering coefficient, formulated for a diffused reflection light, and the minimum value of −0.1 or less. There is provided an infrared cut-off film having a hue of blue and sufficient transparency.

7 Claims, 2 Drawing Sheets

INFRARED CUTOFF FILM

TECHNICAL FIELD

The present invention relates to an infrared cut-off film which is affixed on, for example, a windowpane of a building or a car mainly in order to cut-off the infrared of sun light.

TECHNICAL BACKGROUND

Conventionally, there is used an functional film having a infrared cut-off function, which film shows optical transmission properties to a light in a visible light region and which film reflects or absorbs a light in a infrared region, mainly for inhibiting the thermal influence of radiated sun light. For example, the functional film adherent to a windowpane of a building or a car reduces heat, even when a solar radiation is directly received through the windowpane. Further, in summer, the increase of room temperature is reduced so that cooling efficiency is increased. Furthermore, it gives an additional effect, e.g., the prevention of shattering of the windowpane in a case of a windowpane break.

The above infrared cut-off film has a multi-layered structure, for example, in which a protective layer is stacked on the front surface of a base film and an infrared cut-off layer and an adhesive layer are stacked on the reverse surface in this order. And, the infrared cut-off film is used by affixing the adhesive layer onto a glass or the like. Conventionally, the infrared cut-off layer is formed on a base film by using an infrared absorbent of imonium, aminium or an anthraquinone-containing compound or an infrared reflecting agent of ZnO, $SnO_2$ or a phthalocyanine-containing pigment as an infrared cut-off agent and forming a layer of the infrared cut-off agent by a vacuum deposition method, a spattering method or a method in which a coating composition obtained by dispersing the infrared cut-off agent in a proper resin and used for a infrared cut-off layer is applied.

However, the conventional infrared cut-off agent is colored to have, for example, a puce or cobalt color. As a result, it has poor transparency of a visible light transmittance of 50% or lower. Otherwise, it cuts off only infrared radiation in a long wavelength region of 1000 nm or more, or 1500 nm or more or it cuts off only infrared radiation in a very narrow range of wavelength region.

Thus, a powder of indium tin oxide (ITO, hereinafter) receives attention as a material for improving the defects of the conventional infrared cut-off agent, and it is actually used.

Conventional infrared cut-off films comprising an ITO powder in an infrared cut-off layer have a hue of blue-green or green in most cases and the conventional infrared cut-off films do not have sufficient transparency. Further, a blue film having a sense of transparency is generally preferred as an infrared cut-off film used by affixing it on a windowpane or the like. Therefore, the conventional infrared cut-off films have not sufficiently satisfied the above requirement.

Therefore, it is an object of the present invention to provide an infrared cut-off film having a hue of blue and sufficient transparency in spite of the use of an ITO powder.

DISCLOSURE OF THE INVENTION

The present invention provides an infrared cut-off film having an infrared cut-off layer in which a powder of indium tin oxide is dispersed, wherein the powder of indium tin oxide has a minimum value of a diffused-reflection-functional logarithm, logf $(R_d)$, at a light wavelength of 470 nm or lower, which logarithm is measured on the basis of the following equation formulated for a diffused reflection light, $$f(R_d)=(1-R_d)^2/2R_d=\alpha/S$$

in which $R_d$ is a relative reflectance to a standard sample, $\alpha$ is an absorption coefficient and S is a scattering coefficient, and the above minimum value is −0.1 or less.

MOST PREFERRED EMBODIMENT FOR PRACTICING THE INVENTION

The present inventors have remarked the absorption spectrum of a material in a powder state in an optical measurement as an index which determine the hue and transparency of ITO powder. In pages 331 to 332 of the literature "4th edition, Experimental Chemical Lecture 7, Spectrum II" (published by Maruzen K. K.), the following description is present. When the surface of a sample obtained by compression molding a material in a powder state is irradiated with light, a reflective light from a powder layer may be thought to be the transmitted light of a crystal. The following "equation of Kubelka and Munk" is formulated with regard to this diffused reflection light, $$f(R_d)=(1-R_d)^2/2R_d=\alpha/S \quad (1)$$

wherein $R_d$ is a relative reflectance to a standard sample, $\alpha$ is an absorption coefficient and S is a scattering coefficient.

This relative reflectance, $R_d$, is measured and logf$(R_d)$ is calculated on the basis of the equation, whereby an absorption spectrum is obtained.

The present inventors measured of various ITO powders for a relative reflectance to a standard sample, and converted the measured values by the above equation (1) to obtain spectrums of logf$(R_d)$ which is a logarithm to a diffused reflection function. Further, these ITO powders were used to prepare infrared cut-off film samples. As a result, it has been found that infrared cut-off films obtained by using an ITO powder which has the minimum value of a diffused-reflection-functional logarithm, logf$(R_d)$, shown as a spectrum, at a light wavelength of 470 or less and has the above minimum value of −0.1 or less, have a blue hue having a sufficient sense of transparency. Therefore, the infrared cut-off film of the present invention has been obtained on the basis of the above finding. The infrared cut-off film of the present invention is characterized in that the ITO powder which has the minimum value of a diffused-reflection-functional logarithm, logf$(R_d)$), measured on the basis of the above equation (1), at a light wavelength of 470 or less and has the above minimum value of −0.1 or less is used in an infrared cut-off layer.

Further, with regard to the component molar ratio of the ITO powder in the present invention, oxygen is preferably 0.5 to 10 per 100 of indium.

The embodiment of the present invention will be explained hereinafter.

Figure 1:
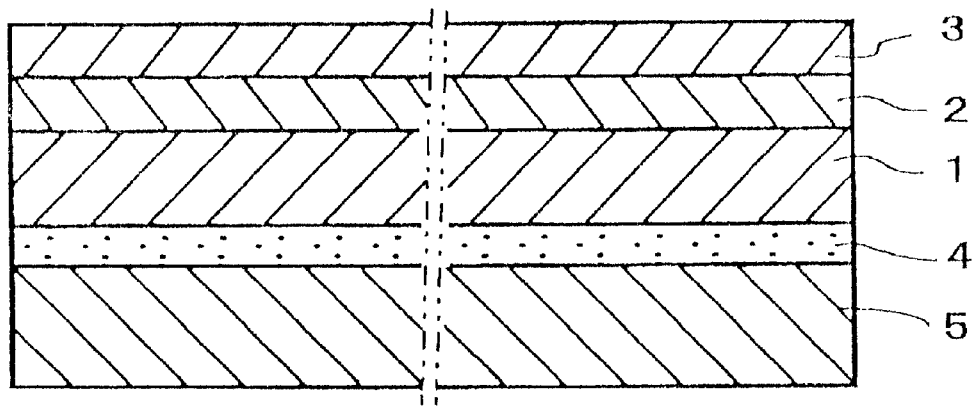
FIG. 1 shows a section view of an example of the layer structure of an infrared cut-off film in the embodiment of the present invention.
Figure 2:
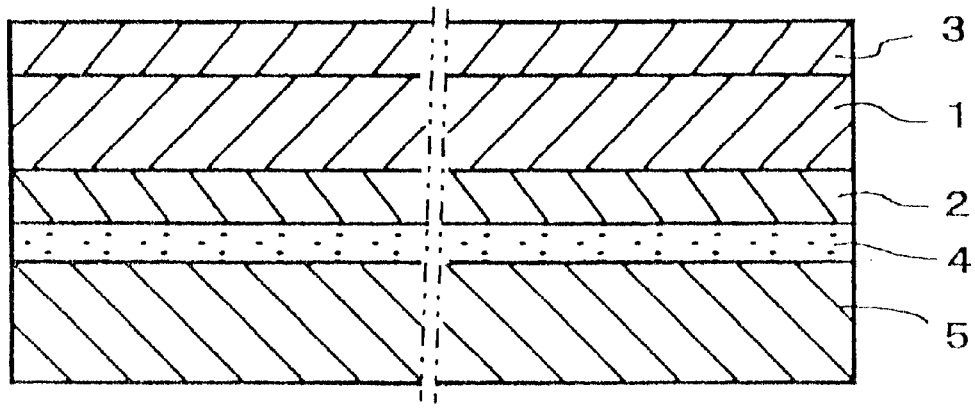
FIG. 2 shows a section view of another example of the layer structure of an infrared cut-off film in the embodiment of the present invention.

In the infrared cut-off film of the present invention, an infrared cut-off layer is laminated on at least one surface of a base film and an adhesive layer is laminated on the above surface. As a preferred state of a practical layer structure, for example, there is cited a state in which the infrared cut-off layer 2 and a protective layer 3 are laminated in this order on the front surface of the base film 1, and on the other hand, the adhesive layer 4 and a separating material 5 are laminated in this order on the reverse surface of the base film 1, as shown in FIG. 1. Otherwise, as shown in FIG. 2, there is also cited a state in which the protective layer 3 is laminated on the front surface of the base film 1 and the infrared cut-off layer 2, the adhesive layer 4 and the separating material 5 are laminated on the reverse surface of the base film 1 in this order. In any case, the separating material 5 is peeled off from the adhesive layer 4 and the adhesive layer 4 adheres to a glass, etc., for use.

The infrared cut-off layer in the infrared cut-off film of the present invention is formed by, in one case, mixing and dispersing an ITO powder which has the above properties, that is, which has the minimum value of a diffused-reflection-functional logarithm, $\log f(R_d)$, at a light wavelength of 470 or less and has the above minimum value of −0.1 or less, in a resin having transparency, to form a coating composition for the infrared cut-off layer, and applying the coating composition onto the base film. In another case, the infrared cut-off layer is formed as a metal thin film layer by a vacuum deposition method or a spattering method. The method of applying the coating composition for the infrared cut-off layer onto the base film includes a mayer bar coating method, a doctor blade coating method, a gravure coating method and a dip coating method. The thickness of the applied coating is preferably 0.5 to 10 μm, more preferably 0.5 to 5 μm. Further, the thickness of the metal thin film layer formed by the vacuum deposition or spattering method is preferably 5 to 500 Å, more preferably 50 to 300 Å. When the thickness is thinner than each lower limit of the above ranges, infrared cut-off properties are decreased. When the thickness excesses each upper limit of the above ranges, a surface is formed in a mirror state so that a visible light transmittance is liable to be too low.

Materials constituting each layer of the infrared cut-off film of the present invention will be described in detail, hereinafter.

A. Base Film

Known transparent films may be used as a base film. Specific examples thereof include various resin films such as polyethylene terephthalate, polyethylene naphthalate, triacetyl cellulose, polyallylate, polyether, polycarbonate, polysulfone, polyether sulfone, cellophane, polyethylene, polypropylene and polyvinyl alcohol. These resin films may be preferably used.

B. ITO Powder as an Infrared Cut-off Agent

As an ITO powder used as an infrared cut-off agent in the infrared cut-off layer in the present invention, there is used an ITO powder which has the minimum value in the spectrum of a diffused-reflection-functional logarithm, $\log f(R_d)$, at a light wavelength of 470 or less and has the above minimum value of −0.1 or less, as described above. From the viewpoint of transparency and dispersibility, the ITO powder preferably has an average particle diameter of 100 nm or less, more preferably 50 nm or less, the most preferably 25 to 35 nm.

In the present invention, the spectrum of the above diffused-reflection-functional logarithm is obtained by measuring a total reflection spectrum in a wavelength range of 200 to 2,600 nm by a 60 mm φ integrating sphere photometry method (aluminum oxide is used as a standard material), and converting the measured total reflection spectrum by "the equation of Kubelka and Munk" (the above equation (1)). The measurement is carried out with a spectrophotometer, e.g., U-4,000, supplied by Hitachi, Ltd.

For example, there is used an ITO powder which is obtained by reacting an aqueous solution containing water-soluble salts of In and a small amount of Sn with alkali to co-precipitate hydroxides of In and Sn and obtain the co-precipitated materials as raw materials, and then calcining these raw materials under heating in a reducing atmosphere such as CO, $NH_3$ or $H_2$, to convert an oxide. The proper adjustments of the component composition of indium, tin and oxygen and calcination conditions gives an ITO powder which has the above-mentioned minimum value of the logarithm to a diffused reflection function. As for the component molar ratio thereof, $In/Sn/O_2$ is preferably 100/5 to 10/0.5 to 10, more preferably 100/5 to 10/0.5 to 2. The above ITO powder has the shortest infrared cut-off wavelength of 800 nm and is remarkably excellent in infrared cut-off function. Further, the color of the infrared cut-off film of the present invention in which an ITO powder like above is dispersed is a blue color having a sense of transparency owing to the reflection of the color of the ITO powder. Users generally like a film having a blue color. When this requirement is present, the above ITO powder can provide a film which sufficiently satisfy the above requirement.

C. Resin Used When an Applied Layer is Formed as an Infrared Cut-off Layer

No special limitation is imposed on a resin with/in which the powder of the infrared cut-off agent is mixed and dissolved, so long as it has film properties and transparency and has adhesive properties to the base film. In particular, an ultraviolet curing resin obtained by incorporating a photo-radical polymerization initiator and/or a photo-cation polymerization initiator into a monomer containing at least one kind of acrylic compound or epoxy compound, is preferably used. The incorporation of the acrylic compound is preferred for controlling the viscosity and crosslinking density of the ultraviolet curing resin, and properties of a coating composition and an applied film, such as heat resistance and chemical resistance.

The epoxy compound includes glycidyl ethers such as tetramethylene glycol diglycidyl ether, propylene glycol diglycidyl ether, neopentyl glycol diglycidyl ether and bisphenol A-diglycidyl ether, epoxy esters such as 2-hydroxy-3-phenoxypropylacrylate and bisphenol A-diepoxy-acrylic acid adduct, and monomers and oligomers formed of the following chemical formulae, such as an alicyclic epoxy,

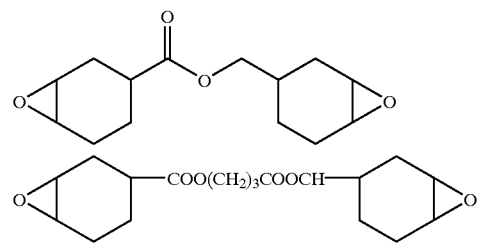

-continued

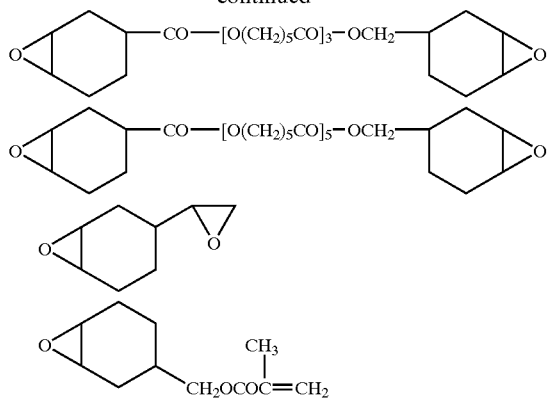

The acrylic compound includes monofunctional acrylates such as lauryl acrylate, ethoxydiethylene glycol acrylate, methoxytriethylene glycol acrylate, phenoxyethyl acrylate, tetrahydrofurfuryl acrylate, isobornyl acrylate, 2-hydroxyethyl acrylate, 2-hydroxypropyl acrylate and 2-hydroxy-3-phenoxy acrylate, polyfunctional acrylates such as neopentyl glycol diacrylate, 1,6-hexanediol diacrylate, trimethylolpropane triacrylate, pentaerythritol triacrylate, pentaerythritol diacrylate and dipentaerythritol hexaacrylate, acrylic acid derivatives such as trimethylolpropane acrylic acid benzoate and trimethylpropane acrylic acid benzoate, monofunctional methacrylates such as 2-ethylhexyl methacrylate, n-stearyl methacrylate, cyclohexyl methacrylate, tetrahydrofurfuryl methacrylate, 2-hydroxyethyl methacrylate and 2-hydroxybutyl methacrylate, methacrylic acid derivatives of polyfunctional methacrylates such as 1,6-hexanediol dimethacrylate, trimethylolpropane trimethacrylate and glycerol dimethacrylate and monomers and oligomers of urethane acrylates such as glycerol dimethacrylate hexamethylene diisocyanate and pentaerythritol triacrylate hexamethylene diisocyanate. Further, a compound containing at least one compound of the following chemical formula is used,

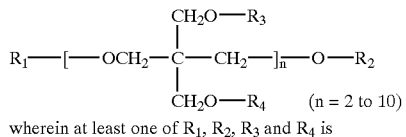

wherein at least one of $R_1$, $R_2$, $R_3$ and $R_4$ is

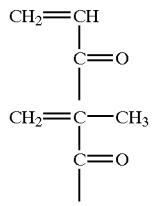

the others are alkyl group, and a lower alkyl group having about 1 to 6 carbon atoms is preferred as the above alkyl group.

The photo-radical polymerization initiator includes, for example, acetophenone compounds of the following chemical formulae,

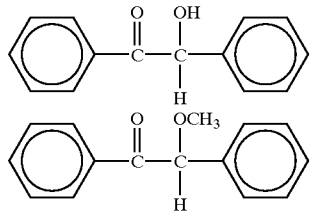

and, for example, benzoin compounds of the following chemical formulae.

The photo-cation polymerization initiator includes compounds of the following chemical formulae. These compounds may be used alone or in combination.

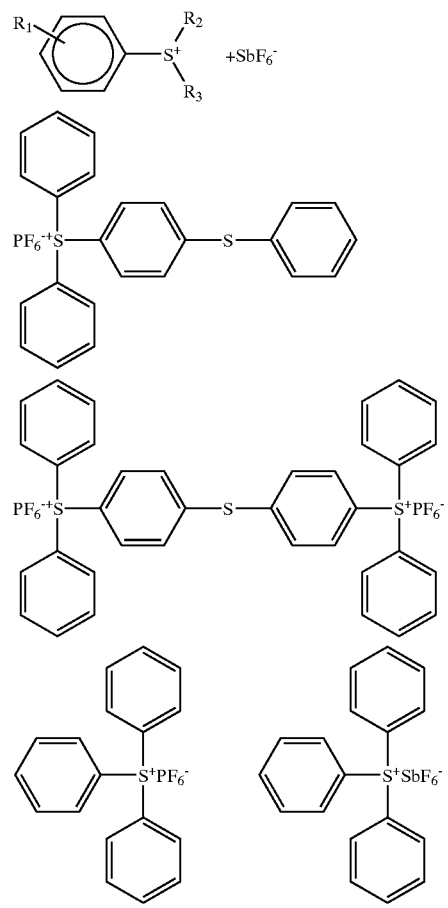

-continued

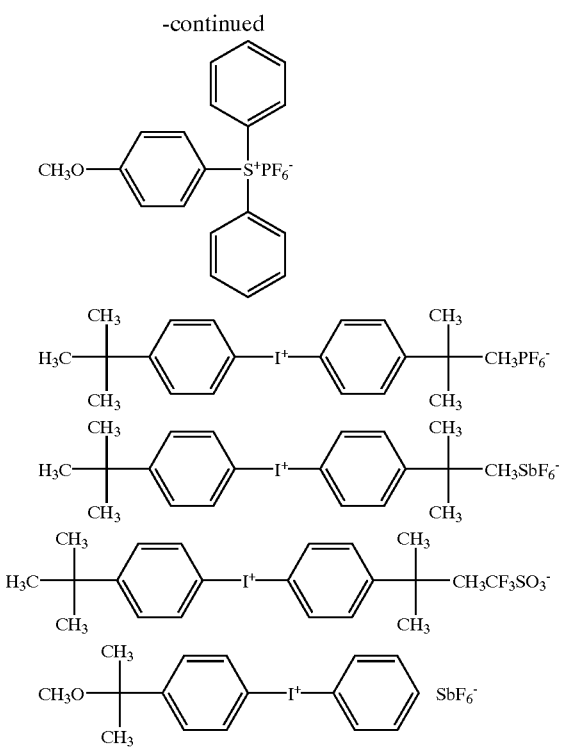

The amount of the photo-radical polymerization initiator and/or the photo-cation polymerization initiator is preferably in the range of 0.1 to 10% by weight based on the main agent. The basis of the amount is as follows. When the amount is smaller than 0.1% by weight or it is greater than 10% by weight, curing by ultraviolet is insufficient.

Further, the transparency of the resin constituting the infrared cut-off layer is preferably as high as possible. It is preferable that light transmittance of at least 80%, preferably at least 90%, measured by "JIS K7105" is secured. In order for the infrared cut-off layer to be easily applied onto the base film and to have high adhesive properties, wetting characteristics are preferably as high as possible. Concretely, the wetting index of the surface (surface tension: dyn/cm) according to "JIS K6768" is preferably 50 or less, more preferably 36 to 46.

With regard to the amount ratio of the ITO powder and the resin which constitute the coating composition for an infrared cut-off layer, ITO powder/resin is 90/10 to 60/40 in a weight ratio, preferably 85/15 to 65/35, more preferably 80/20 to 70/30. In the above amount ratio range, even a thin layer of about 1 μm shows fine infrared cut-off properties so that a film having high transparency and little haze can be obtained. When the amount ratio of the ITO powder is larger than 90% by weight, a film is liable to be colored too much with the ITO powder or the degree of a haze is liable to be too high. And, a metallic sheen is also increased, the peeling of the infrared cut-off layer or a cohesive failure is caused and, further, the adhesive properties to the base film are poor. Further, when the amount ratio of the ITO powder is smaller than 60% by weight, an intended infrared cut-off function is not attained in some cases.

D. Pigment

In the present invention, a pigment such as ZnO, SnO$_2$, TiO$_2$, etc., may be incorporated in the infrared cut-off layer. That is, the pigment together with ITO powder is mixed with the resin to form an infrared cut-off layer. The pigment performs an infrared cut-off function together with the ITO powder. The infrared cut-off wavelength range thereof is 1,200 to 2,500 nm. Therefore, the combination of the pigment and the ITO powder can set the amount ratio of the ITO powder in the resin at a low degree in the above range without decreasing cut-off properties of 800 to 2,500 nm infrared wavelengths which are so-called a near infrared range. Owing to this, it becomes possible to decrease the amount of ITO powder which is expensive so that cost-reduction is attained. These pigments are required to have an average particle diameter of 100 nm or less for inhibiting the metallic sheen or attaining a fine electromagnetic wave transmittance.

E. Protective Layer

As a protecting agent which constitutes the protective layer, generally, there may be used a resin which is curd by an electrolytic dissociation radiation, heat or combination of these.

The radiation curable resin is selected from compositions obtained by properly mixing monomers, oligomers or pre-polymers containing polymerizable unsaturated bond, such as an acryloyl group, a methacryloyl group, an acryloyloxy group and a methacryloyloxy group. Examples of the monomers include styrene, methyl acrylate, methyl methacrylate, methoxy polyethylene methacrylate, cyclohexyl methacrylate, phenoxyethyl methacrylate, ethylene glycol dimethacrylate, dipentaerythritol hexaacrylate, trimethylolpropane trimethacrylate, etc. The oligomers and the prepolymers include acrylates such as polyester acrylate, polyurethane acrylate, epoxy acrylate, polyether acrylate, alkyd acrylate, melamine acrylate and silicone acrylate, unsaturated polyester and epoxy compounds. These may be used alone or in combination. The amount of the monomer is adjusted at a low degree when the flexibility of a cured film is required. For decreasing a crosslinking density, further, the use of an acrylate-containing monomer having one function or 2 functions is preferred. Reversely, when severe endurances such as heat resistance, abrasiveness and solvent resistance are required for the cured film, the amount of the monomer is increased and it is preferred to use an acrylate-containing monomer having a least 3 functions.

It is sufficient to irradiate a radiation such as an ultraviolet ray, an electron ray or X-ray for curing the above electrolytic-dissociation-radiation-curable resin. A polymerization initiator may be properly added as required. When an ultraviolet ray cures the resin, a photopolymerization initiator must be added. The photopolymerization initiator includes acetophenones such as diethoxy acetophenone, 2-hydroxy-2-methyl-1-phenylpropane-1-one, benzildimethyl ketal, 1-hydroxycyclohexyl-phenylketone and 2-methyl-2-morpholino (4-thiomethylphenyl)propane-1-one, benzoin ethers such as benzoin methyl ether, benzoin ethyl ether, benzoin isopropyl ether and benzoin isobutyl ether, benzophenones such as benzophenone, o-benzoyl methyl benzoate, 4-phenylbenzophenone, 4-benzoyl-4'-methyl-diphenyl sulfide, 4-benzoyl-N,N-dimethyl-N-[2-(1-oxo-2-propenyloxy)ethyl]benzene methanaminium bromide and (4-benzoylbenzyl) trimethyl ammonium chloride, thioxanthones such as 2,4-diethylthioxanthone and 1-chloro-4-dichlorothioxanthone, and 2,4,6-trimethylbenzoyl diphenyl benzoyl oxide. These may be used alone or in combination. Further, an amino compound such as N,N-dimethylparatoluidine or 4,4'-diethylaminobenzenephenone is incorporated as a promoter (sensitizer) for use.

Further, as a resin used for the protecting agent, in particular, it is preferred to use an ultraviolet-curable epoxy compound in view of its excellent hardness and transparent adhesive properties. Specific epoxy compound includes glycidyl ethers such as tetramethylene glycol diglycidyl ether, propylene glycol diglycidyl ether, neopentyl glycol diglycidyl ether and bisphenol A-diglycidyl ether, and epoxy esters such as 2-hydroxy-3--phenoxypropyl acrylate and bisphenol A-diepoxy-acrylic acid adduct. Further, as the other polymerization initiator, a photo-radical polymerization initiator and/or a photo-cation polymerization initiator may be used. The same initiators as those used in the above infrared cut-off layer are cited. The amount thereof is preferably in the range of 0.1 to 10% by weight based on the main agent. When the above amount is smaller than 0.1% by weight or lager than 10% by weight, an ultraviolet curing is liable to be insufficient.

F. Adhesive Layer

As an adhesive agent forming the adhesive layer, an acrylic adhesive agent composed of a resin containing, for example, acrylic acid ester or methacrylic acid ester as a main component is used. A metal chelate-containing, isocyanate-containing or epoxy-containing linking agent as a hardener is mixed with the above agent for use as required. These linking agents are used alone or in combination. The above adhesive agent is practically preferably incorporated such that adhesion strength (according to JIS Z0237) as an adhesive layer is adjusted in the range of 100 to 2,000 g/25 mm. Further, generally, the thickness of the adhesive layer after drying is preferably 10 to 50 µm. Further, the proper incorporation of an ultraviolet absorbent into the adhesive layer gives an ultraviolet cut-off effect together. As the ultraviolet absorbent, p-t-butylphenyl salicylate, 2-hydroxy-4-methoxybenzophenone, 2-hydroxy-4-octoxybenzophenone, 2,2'-dihydroxy-4-methoxybenzophenone, 2'-(2'-hydroxy-5-methylphenyl)benzotriazol, 2-(2'-hydroxy-3'-t-butyl-5'-methylphenyl)-5-chlorobenzotriazol, or 2-(2'-hydroxy-3',5'-di-t-butylphenyl)benzotriazol is preferably used.

G. Other materials

Solvents added to each coating composition of an infrared cut-off layer, a protective layer and an adhesive layer Each coating composition for the protective layer, the adhesive layer and the infrared cut-off layer may properly contain organic solvents such as benzene, toluene, acetone, methyl ethyl ketone, isophorone and cyclohexanone as a solvent. These organic solvents may be added alone or in combination.

Surfactants added to the coating composition for an infrared cut-off layer

A very small amount of surfactant (e.g., nonionic surfactant) may be added to the coating composition for the infrared cut-off layer for improving the dispersibility of an ITO powder.

Further, while the film of the present invention has the principal purpose of an infrared cut-off, an ultraviolet cut-off effect is also obtained by properly adding the ultraviolet absorbent, as described above, into at least one layer other than the above adhesive layer similarly to the case of the above adhesive layer.

EXAMPLES

The effects of the present invention will be described with reference to Examples, hereinafter.

Figure 3:
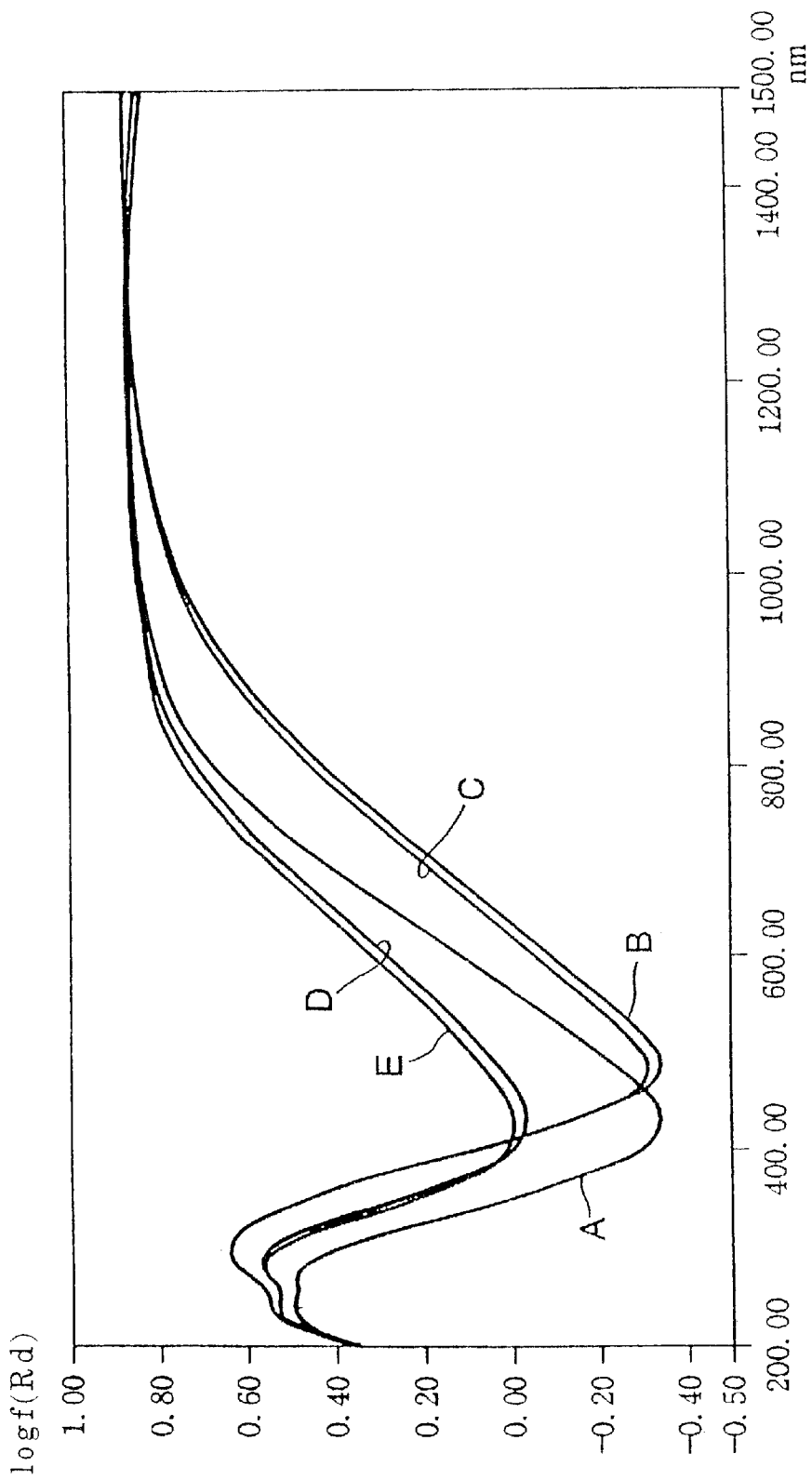
FIG. 3 shows a diagram of diffused-reflection-functional logarithms, logf$(R_d)$, of the ITO powders used in Examples and Comparative Examples in the present invention.

Samples A to E of five kinds of ITO powders each of which has different calcination conditions and component molar ratio from those of the others, were optically measured for relative reflectances to a standard sample with a spectrophotometer (U-4,000, supplied by Hitachi, Ltd.). Spectrums of diffused-reflection-functional logarithms were measured on the basis of the above equation (1) in the light wavelength range of 200 to 2,600 nm, and the minimum values thereof were examined. In FIG. 3, the results thereof are graphed. Among these samples A to E, only the sample A satisfied the conditions of the present invention. The other four samples B to E deviated from the conditions of the present invention. Table 1 shows the minimum values of the absorption spectrums of these ITO powders A to E and wavelengths at those values.

TABLE 1

|  | A | B | C | D | E |
|---|---|---|---|---|---|
| Minimum value | −0.35 | −0.35 | −0.32 | −0.04 | −0.01 |
| Wavelength (nm) | 425 | 485 | 480 | 425 | 420 |

Preparation of Infrared Cut-off Films

Example 1

ITO powder of sample A (In/Sn/O$_2$=100/7.5/0.9)38 parts

An ultraviolet curable resin (trade name: Z-7501, supplied by JSR) 31 parts

Solvent (methyl isobutyl ketone) 31 parts

These components were used to prepare a coating composition for an infrared cut-off layer. The coating composition was applied onto the surface of a 50 µm thick polyethylene terephthalate film (trade name: Emblet MS, supplied by UNITIKA Ltd.) by a mayer bar coating method such that the coating film after drying had a thickness of 1.5 µm. The coating film was dried at 105° C. for 1 minute, to form an infrared cut-off layer, whereby the infrared cut-off film of Example 1 was obtained. The infrared cut-off film was measured for an optical transmission spectrum with the above-mentioned spectrophotometer, to show that it had excellent infrared cut-off properties.

Comparative Example 1

An infrared cut-off film of Comparative Example 1 was obtained in the same manner as in Example 1 except that Sample B was used as an ITO powder.

Comparative Example 2

An infrared cut-off film of Comparative Example 2 was obtained in the same manner as in Example 1 except that Sample C was used as an ITO powder.

Comparative Example 3

An infrared cut-off film of Comparative Example 3 was obtained in the same manner as in Example 1 except that Sample D was used as an ITO powder.

Comparative Example 4

An infrared cut-off film of Comparative Example 4 was obtained in the same manner as in Example 1 except that Sample E was used as an ITO powder.

Tests of a Hue and Transparency

The infrared cut-off films of Example 1 and Comparative Examples 1 to 4 were evaluated for a hue, a HAZE value and a light transmittance(550 nm). Table 2 shows the results. Further, the hue, the HAZE value and the light transmittance (%) shown in Table 2 were measured as follows.

Hue: According to a visual observation.

HAZE value: According to a measuring method of a haze value, defined in JIS K7105.

Light transmittance: Whole light transmittance defined in JIS K7105 was measured, and the value of the whole light transmittance at a wavelength of 550 nm was used.

TABLE 2

|  | Example 1 | CEx. 1 | CEx. 2 | CEx. 3 | CEx. 4 |
|---|---|---|---|---|---|
| Hue | Blue | Green | Green | Blue | Blue |
| HAZE value | 1.2 | 3.6 | 3.7 | 2.1 | 2.0 |
| Light transmittance (%) | 86.0 | 81.9 | 82.2 | 80.8 | 80.9 |

CEx. = Comparative Example.

As is apparent from Table 2, the infrared cut-off film of the present invention had a blue hue, had a small Haze value and was free of a haze. And, the infrared cut-off film of the present invention had a high light transmittance and excellent transparency. On the other hand, Each film of Comparative Examples was inferior to the infrared cut-off film of the present invention in transparency. Further, the films of Comparative Examples 1 and 2 had a conventional type green color so that they were poor in visual appreciation.

INDUSTRIAL UTILITIES

As described above, according to the present invention, there is provided an infrared cut-off film which surely has excellent infrared cut-off properties, has a blue hue excellent in visual appreciation and has sufficient transparency by using an ITO powder in which the minimum value of a diffused-reflection-functional logarithm is −0.1 or less at a light wavelength of 470 or less, into an infrared cut-off layer.

We claim:

1. An infrared cut-off film having an infrared cut-off layer which is formed on a film by using a coating composition obtained by mixing and dispersing a powder of indium tin oxide in a resin having transparency, wherein the powder of indium tin oxide has a minimum value of a diffused-reflection-functional logarithm, logf $(R_d)$), at a light wavelength of 470 nm or lower, which logarithm is measured on the basis of the following equation formulated for a diffused reflection light, $$f(R_d)=(1R_d)^2/2R_d=\alpha/S$$

in which $R_d$ is a relative reflectance to a standard sample, $\alpha$ is a an absorption coefficient and S is a scattering coefficient, and the above minimum value is −0.1 or less, and the resin having transparency is an ultraviolet curable resin obtained by incorporating a photo-cation polymerization initiator into a monomer containing at least one acrylic compound or epoxy compound.

2. The infrared cut-off film according to claim 1, wherein the powder of indium tin oxide has a molar ratio of 0.5 to 10 of oxygen per 100 of indium.

3. The infrared cut-off film according to claim 1, wherein the powder of indium tin oxide has a molar ratio of 5 to 10 of tin and 0.5 to 10 of oxygen per 100 of indium.

4. The infrared cut-off film according to claim 1, wherein the applied layer has a thickness of 0.5 to 10 μm.

5. The infrared cut-off film according to claim 1, where in the coating composition has an indium tin oxide/resin weight ratio in the range of 90/10 to 60/40.

6. The infrared cut-off film according to claim 1, wherein the coating composition in which the powder of indium tin oxide is mixed and dissolved further contains a pigment having an average particle diameter of 100 nm or less.

7. The infrared cut-off film according to claim 1, wherein the powder of indium tin oxide has an average particle diameter of 100 nm or less.

* * * * *